(12) United States Patent
Park et al.

(10) Patent No.: US 7,575,247 B2
(45) Date of Patent: Aug. 18, 2009

(54) LOWER PANEL PROVIDED WITH KNEE AIR BAG

(75) Inventors: Joon Mo Park, Seoul (KR); Uon Jae Jung, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/938,046

(22) Filed: Nov. 9, 2007

(65) Prior Publication Data

US 2008/0136147 A1 Jun. 12, 2008

(30) Foreign Application Priority Data

Dec. 7, 2006 (KR) ...................... 10-2006-0124096

(51) Int. Cl.
*B60R 21/20* (2006.01)
(52) U.S. Cl. .................................. 280/728.3; 280/732
(58) Field of Classification Search ............. 280/730.1, 280/752, 728.3, 732
See application file for complete search history.

(56) References Cited

U.S. PATENT DOCUMENTS

| 6,213,497 | B1 * | 4/2001 | Spencer et al. | ........... 280/730.1 |
| 6,619,689 | B2 * | 9/2003 | Spencer et al. | ........... 280/730.1 |
| 6,902,186 | B2 * | 6/2005 | Suzuki et al. | ............ 280/730.1 |
| 7,185,912 | B2 * | 3/2007 | Matsuura et al. | ......... 280/728.3 |
| 7,261,318 | B2 * | 8/2007 | Enders | ....................... 280/732 |

FOREIGN PATENT DOCUMENTS

JP   2003-205814   7/2003

* cited by examiner

*Primary Examiner*—Faye M. Fleming
(74) *Attorney, Agent, or Firm*—Morgan, Lewis & Bockius LLP

(57) ABSTRACT

A panel includes an air bag insert hole. An air bag housing is mounted in the air bag insert hole. The air bag housing includes a connector. A bracket is attached to the panel and to the connector, to connect the air bag housing to the panel. The panel may further include at least one breakable portion, configured to break upon inflation of an air bag cushion mounted within the air bag housing. The breakable portion may include thinner material than material of a remaining portion of the panel, perforations, or a crack. The bracket may have a higher ductility than the lower panel. The bracket may be bolted to the lower panel. The connector may include a secondary hole. The bracket has a portion that is inserted in the secondary hole.

12 Claims, 2 Drawing Sheets

LOWER PANEL PROVIDED WITH KNEE AIR BAG

CROSS-REFERENCE TO RELATED APPLICATION

This application claims priority to, and the benefit of, Korean Patent Application No. 10-2006-0124096, filed in the Korean Intellectual Property Office on Dec. 7, 2006, the entire contents of which are incorporated herein by reference.

BACKGROUND OF THE INVENTION (a) Field of the Invention

The present invention relates to a lower panel provided with a knee air bag. More particularly, the present invention relates to a lower panel that is not scattered when the air bag cushion expands, breaking the lower panel.

(b) Description of the Related Art

A conventional knee air bag is mounted at a lower panel. During a collision, an air bag housing is torn along a tear line and an air bag cushion expands, protecting the driver's knees from machinery disposed in front of the driver's seat.

When the air bag cushion expands, the air bag housing hits the lower panel, breaking the lower panel into pieces, which are propelled towards the driver. Thus, the driver may be injured.

The above information disclosed in this Background section is only for enhancement of understanding of the background of the invention and therefore it may contain information that does not form the prior art that is already known in this country to a person of ordinary skill in the art.

SUMMARY OF THE INVENTION

A panel includes an air bag insert hole. An air bag housing is mounted in the air bag insert hole. The air bag housing includes a connector. A bracket is attached to the panel and to the connector, to connect the air bag housing to the panel.

The panel may further include at least one breakable portion, configured to break upon inflation of an air bag cushion mounted within the air bag housing.

The breakable portion may include thinner material than material of a remaining portion of the panel, perforations, or a crack.

The bracket may have a higher ductility than the lower panel.

The bracket may be bolted to the lower panel.

The connector may include a secondary hole. The bracket has a portion that is inserted in the secondary hole.

DETAILED DESCRIPTION OF PREFERRED EMBODIMENTS

Figure 1:
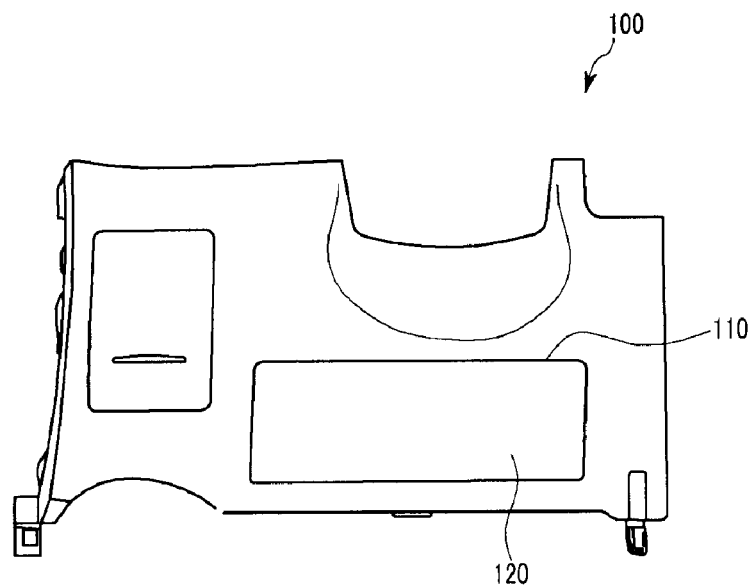
FIG. 1 is a front view of a lower panel provided with a knee air bag according to an exemplary embodiment of the present invention.

Hereinafter, referring to the drawings, an exemplary embodiment of the present invention will be described in detail.

Figure 2:
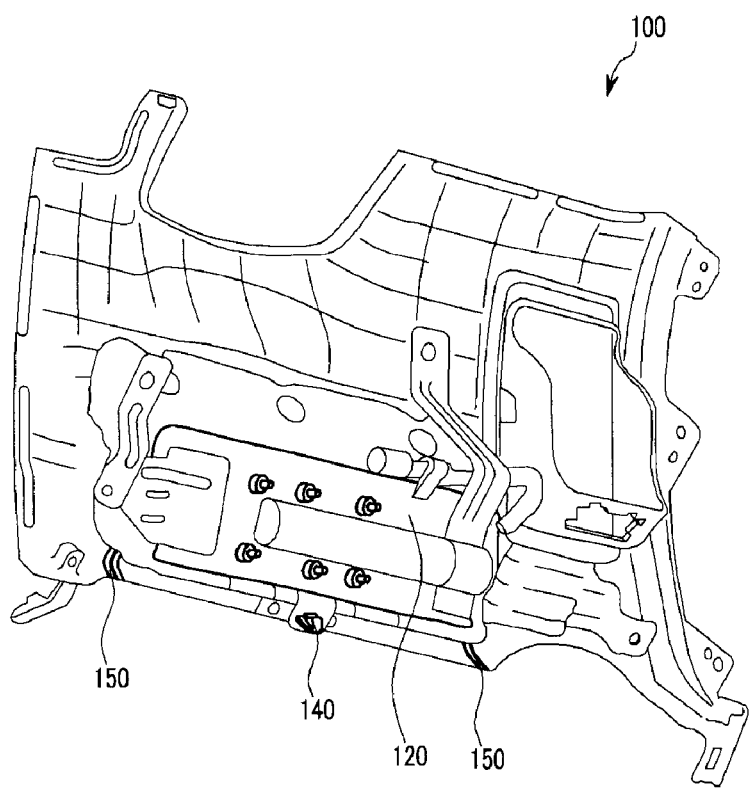
FIG. 2 is a perspective view of a back surface of a lower panel provided with a knee air bag according to an exemplary embodiment of the present invention.

As shown in FIG. 1 and FIG. 2, a lower panel 100 according to an exemplary embodiment of the present invention includes an air bag insert hole 110, in which an air bag housing 120 is inserted.

Breakable portions 150 extend from each side of the air bag insert hole 110 to a lower edge of the lower panel 100. Therefore, when an air bag cushion (not shown) expands, the lower panel 100 breaks only at the breakable portions 150. The breakable portions 150 may include, for example and without limitation, areas of thinner material than the remaining portion of the lower panel 100, perforations, and/or cracks.

Figure 4:
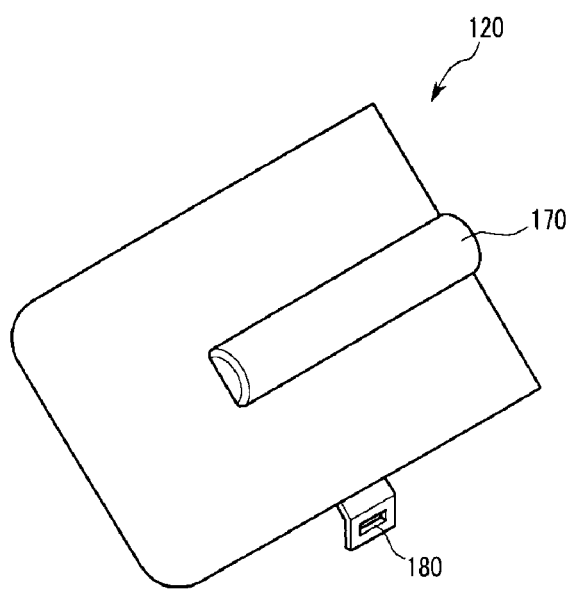
FIG. 4 is a perspective view showing an air bag housing according to an exemplary embodiment of the present invention.

The air bag housing 120 is mounted in the air bag insert hole 110. As shown in FIG. 4, the knee air bag 170 is mounted in the air bag housing 120. A tear line (not shown) is provided on the housing 120 at a position corresponding to the knee air bag 170. The tear line is positioned and configured for the air bag 170 to inflate therethrough, and may have any appropriate structure and shape, such as, for example, the traditional "H" shape. The knee air bag 170 is provided with an air bag cushion (not shown) and an inflator (not shown) that supplies gas to the air bag cushion.

In operation, the inflator supplies gas to the air bag cushion, and the air bag cushion expands. The air bag housing 120 is torn along the tear line, and the air bag cushion continues to expand outside the air bag housing 120.

A connector, such as a hook insert hole 180 is further provided at a lower edge of the air bag housing 120.

Figure 3:
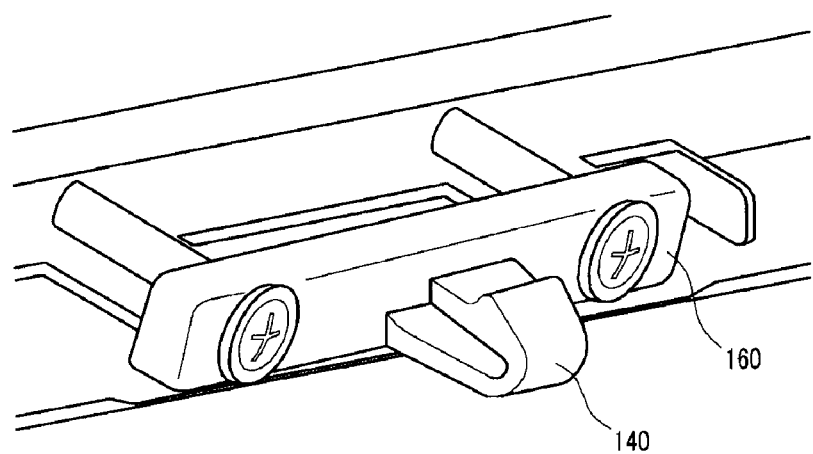
FIG. 3 is an enlarged view showing a bracket coupled with a lower panel according to an exemplary embodiment of the present invention.

A bracket 160, as shown in FIG. 3, is fastened to the lower edge of the lower panel 100, such as by being bolted thereto. A hook 140, which is inserted into the hook insert hole 180, is provided on the bracket 160. The hook 140 is capable of being coupled and decoupled to the hook insert hole 180.

The bracket 160 should not break when the air bag 170 inflates. To this end, it may be more ductile than the lower panel 100. The lower panel 100 is therefore broken only at the breakable portions 150, and the bracket 160 restrains the air bag housing 120 when the air bag cushion expands, preventing the air bag housing 120 from hitting the lower panel 100.

Hereinafter, operation of the present invention will be described in detail.

When a vehicle accident occurs, the air bag cushion expands, putting force on the lower panel 100 and the air bag housing 120. The lower panel 100 breaks at the breakable portions 150, and the air bag housing 120 is restrained by the bracket 160. Therefore, the air bag housing 120 is prevented from hitting and breaking the lower panel 100. In addition, the shape of the lower panel 100, post-break, is predetermined, and thus the lower panel 100 is not broken into a large number of pieces.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus, comprising:
   a panel comprising an air bag insert hole;
   an air bag housing mounted in the air bag insert hole and comprising a connector; and a bracket, attached to the panel and to the connector, to connect the air bag housing to the panel, wherein the panel further comprises at least one breakable portion, configured to break upon inflation of an air bag cushion mounted within the air bag housing, and wherein the connector comprises a secondary hole, and wherein the bracket comprises a portion that is inserted in the secondary hole.

2. The apparatus of claim 1, wherein the breakable portion comprises thinner material than material of a remaining portion of the panel.

3. The apparatus of claim 1, wherein the breakable portion comprises at least one perforation.

4. The apparatus of claim 1, wherein the breakable portion comprises at least one crack.

5. The apparatus of claim 1, wherein the bracket comprises a higher ductility than the panel.

6. The apparatus of claim 1, wherein the bracket is bolted to the panel.

7. An apparatus, comprising:

a panel comprising an air bag insert hole;

an air bag housing mounting an air bag cushion therewithin, the air bag housing mounted in the air bag insert hole and comprising a connector and a tear line formed above the air bag cushion at the air bag housing; and a bracket, attached to the panel and the connector, to connect the air bag housing to the panel, wherein the panel further comprises at least one breakable portion, configured to break upon inflation of the air bag cushion mounted within the air bag housing, and wherein the connector comprises a secondary hole, and wherein the bracket comprises a portion that is inserted in the secondary hole.

8. The apparatus of claim 7, wherein the breakable portion comprises thinner material than material of a remaining portion of the panel.

9. The apparatus of claim 7, wherein the breakable portion comprises at least one perforation.

10. The apparatus of claim 7, wherein the breakable portion comprises at least one crack.

11. The apparatus of claim 7, wherein the bracket comprises a higher ductility than the panel.

12. The apparatus of claim 7, wherein the bracket is bolted to the panel.

* * * * *